United States Patent [19]
Gabel et al.

[11] 3,750,957
[45] Aug. 7, 1973

[54] TORCH FOR THERMOCHEMICAL PROCESSING OF WORK PIECES

[75] Inventors: Heinz Gabel, Frankfurt/Main; Hans Hirschberg, Altenhain/TS; Gerhardt Lange, Frankfurt/Main, all of Germany

[73] Assignee: Messer Griesheim GmbH, Frankfurt/Main, Germany

[22] Filed: Sept. 16, 1971

[21] Appl. No.: 181,150

[30] Foreign Application Priority Data
Sept. 19, 1970 Germany .................. P 20 46 414.6

[52] U.S. Cl. ............................ 239/424, 239/424.5
[51] Int. Cl. ........................................... B05b 7/00
[58] Field of Search ............... 239/424, 422, 424.5; 266/23 P, 23 Q, 23 H

[56] References Cited
UNITED STATES PATENTS

| | | |
|---|---|---|
| 2,510,210 | 6/1950 | Bucknam et al. ............. 266/23 P X |
| 2,725,933 | 12/1955 | Gaucher .......................... 239/424 X |
| 2,425,709 | 8/1947 | Bucknan et al. ..................... 239/424 |
| 3,390,838 | 7/1968 | Stalberger ...................... 239/424 X |
| 3,498,848 | 3/1970 | Kidowaki ...................... 266/23 P X |
| 2,425,710 | 8/1947 | Bucknan et al. ................ 239/424.5 |
| 2,266,834 | 12/1941 | Walker et al. ................... 239/424.5 |

Primary Examiner—M. Henson Wood, Jr.
Assistant Examiner—John J. Love
Attorney—Arthur G. Connolly et al.

[57] ABSTRACT

A torch for the thermochemical processing of work pieces has at least one channel for the processing oxygen and at least one channel for the fuel gas and heating oxygen mixture-components in the form of separate channels for the components or a single channel for the mixture. A common discharge opening is provided for the various gases. The processing oxygen channel has a depression at its outlet with the depression being at an angle of 90°–150° and preferably 120°.

12 Claims, 1 Drawing Figure

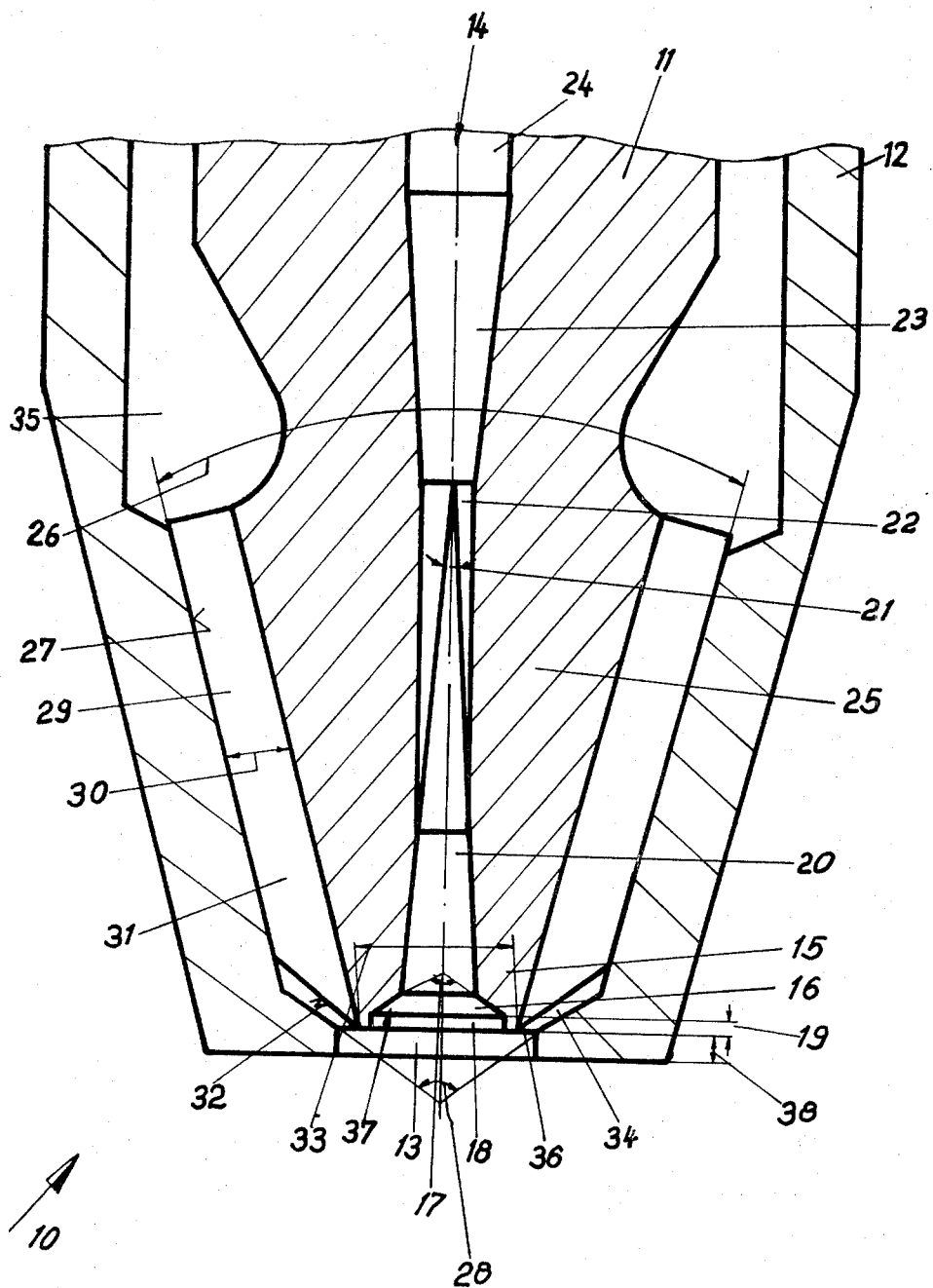

TORCH FOR THERMOCHEMICAL PROCESSING OF WORK PIECES

BACKGROUND OF INVENTION

This invention relates to a torch for the thermochemical processing of work pieces having at least one channel for the processing oxygen and at least one channel for a fuel gas heating oxygen mixture or with channels for the separate supply of fuel gas and heating oxygen and with at least one common discharge opening for the various media.

The object of the invention is to provide a torch by means of which higher cutting speeds may be achieved while maintaining an optimum cutting surface quality with reference to cutting groove follow-up, cutting groove depth, evenness of cutting surface, notching edges and low slag adhesion at the underside of the torch cut.

SUMMARY OF INVENTION

As a solution to this problem it is suggested according to the invention that the channel for the processing oxygen have a depression at the outlet and that the angle of the depression be about 90° – 150°, and preferably about 120°.

THE DRAWING

The single FIGURE illustrates the tip of the inventive torch used for work piece thicknesses of up to 100 mm.

DETAILED DESCRIPTION

In the following table are given some cutting data, which had been achieved by means of the novel torch (column I). In addition, there are given in the table cutting data which had been achieved with a known powerful torch (column II).

Because of the inventive suggestion, it is possible to increase the cutting speed by more than 20 percent, and despite this, the cut has an optimum quality.

An explanation of this occurrence is that because of the processing oxygen being discharged at great speed in the area of the depression, there results a vacuum, so that the fuel-gas heating oxygen mixture — hereinafter referred to as the "mixture" — is sucked in this area (injection effect) and already inside the torch envelops the oxygen jet, and thus its jacket, with combustible gases.

With the emitted processing oxygen jet, this enriched jacket zone is discharged from the torch. In this connection, during the emission there takes place in this zone a more complete combustion of the combustible gases with portion of the processing oxygen, and the jacket zone becomes hotter as a result. This hot zone increases the heat supply in the reaction point. Furthermore, a focusing or tapering of the oxygen jet is achieved along its entire length, caused by the expansion of the hot gas jacket resulting in the combustion, which also effects the direction of the oxygen jet. Thereby the oxygen supply per surface unit remains substantially constant along the length of the jet. Of particular advantage is the reduction of the cutting groove follow-up resulting thereby.

This hot jacket zone allows, as experiments have shown, a greater distance of the torch from the work piece surface, and the torch is furthermore less sensitive to distance changes with the cutting surface quality remaining the same.

According to a further suggestion of the invention, the channel for the processing oxygen, viewed against the direction of flow, is formed conically behind the novel depression, the cone angle being about 6°. By this construction, the expansion of the processing oxygen is supported and a nearly laminar flow of the oxygen jet is achieved.

For an improvement of the stated injection effect, it is suggested according to the invention that the depression, viewed in the direction of flow, end in a cylindrical outlet, the length of the cylindrical outlet being about 0.1 – 1 mm, and preferably 0.3 mm.

In a further development of the invention it is suggested that the discharge opening for the fuel-gas heating-oxygen mixture be an annular slot of a channel, which is connected with the channels for this mixture. By this construction a supply of the mixture, uniform from all sides, to the processing oxygen stream is achieved.

Referring now to the drawing the novel torch 10 consists of a cutting nozzle or nozzle body 11 made of brass, and slipped thereover is a nozzle cap 12 made of copper in which an outlet bore 13 is provided which is common to the cutting oxygen and to the mixture. The cutting nozzle 11 has a centrally arranged cutting oxygen channel 14.

This channel is provided at outlet 15 with a frustoconical depression 16, whose angle is about 90° to

| Thickness of sheet/mm. | Cutting speed, mm./min. | | Cutting nozzle bore/mm. | | Cutting oxygen supply pressure, atmospheres absolute pressure | | Fuel gas supply pressure, atmospheres absolute pressure | | Torch distance from workpiece/mm. | | Heating oxygen pressure, atmospheres pressure | | Cutting quality, German indust. Norm 2310 | |
|---|---|---|---|---|---|---|---|---|---|---|---|---|---|---|
| | I | II | I | II | I | II | I | II | I | II | I | II | I | II |
| 10 | 750 (660) | 660 (550) | 0.9 (0.9) | 0.95 (0.95) | 6-8 (6-8) | 3.0 (3.0) | | | | | | | | |
| 20 | 550 (530) | 450 (440) | 1.0 (1.0) | 1.1 (1.1) | 6-8 (6-8) | 3.5 (3.5) | | | | | | | | |
| 30 | 460 (450) | 380 (370) | 1.0 (1.0) | 1.15 (1.15) | 6-8 (6-8) | 4.5 (4.5) | | | | | | | | |
| 40 | 420 (420) | 340 (340) | 1.15 (1.15) | 1.4 (1.4) | 6-8 (6-8) | 4.0 (4.0) | 0.02-1.5 (0.1-1.5) | | 10-25 (10-25) | | 3-7 (3-7) | | 1-5 (1-5) | Quality I | Quality I |
| 50 | 390 (390) | 320 (320) | 1.15 (1.15) | 1.4 (1.4) | 6-8 (6-8) | 4.5 (4.5) | | | | | | | | |
| 80 | 340 (340) | 280 (280) | 1.4 (1.4) | 1.8 (1.8) | 6-8 (6-8) | 5.5 (5.5) | | | | | | | | |
| 100 | 310 (310) | 260 (260) | 1.4 (1.4) | 1.8 (1.8) | 6-8 (6-8) | 6.0 (6.0) | | | | | | | | |

NOTE.—Material=St 37; Fuel Gas=Acetylene (values in parentheses are for propane, illuminating gas, natural gas); Temperature=Room temperature.

150°, and preferably 120°. A cylindrical recess 18 is attached to depression 16. The length 19 of recess 18 is 0.1 – 1 mm, preferably 0.3 mm. Recess 18 has a diameter of about 2.5 mm. Viewed opposite the flow of current, area 20 of cutting channel 14 is shaped conically behind the depression 16, the cone angle 21 being about 6°. This conical area 20 changes to a cylindrical area 22, which represents the narrowest cross-section of the cutting oxygen channel. Cylindrical area 22 is again connected, by means of a conically expanded intermediate area 23, with a supply channel 24 having a larger diameter by means of which the oxygen at a pressure of about 6 – 8 atmospheres absolute pressure is supplied to the narrowest point 22 of the cutting channel 14. Sections with good quality may also be achieved at pressures down to 1.5 atmos. abs. press., the cutting speed then being greater than that given in the table, however.

The end area 25 of the cutting nozzle 11 has a conical outside shape, the cone angle 26 being about 25° to 30°. This end area 25 abuts a cone bore 27 of the nozzle cover 12 with the same cone angle. The nozzle cover 12, viewed in the direction of flow, is constructed tapering conically behind the cone bore 27, the cone angle 28 being about 120°.

In the outside wall of the end area 25 of the cutting nozzle there are provided slots 29 which are covered by nozzle cover 12. Slots 29 have a depth 30 of about 1.3 mm. The slot width is 0.2 to 0.4 mm, and preferably 0.3 mm. In end area 31 of slots 29 the cutting nozzle 11 has a chamfer 32 of about 120°, the chamfer ending at the circumference of root line 33 of slot 29. The diameter of the root line 33 is about 2.8 mm. These dimensions of the slots, according to the invention, are the same for all torches up to cutting thicknesses of about 100 mm.

Cutting nozzle 11, as compared to the nozzle cover 12, is somewhat reset, so that within the torch 10, the annular channel 34 is formed by the cutting nozzle and nozzle cover.

In the torch constructed according to the invention, the mixture flows through inlet 35 and slots 29 into the annular channel 34 and through the annular slot 36 within the torch toward the cutting oxygen jet as well as in the area 37 of depression 16.

In the exemplary embodiment, the outlet bore 13 in the nozzle cover 12 is constructed for an acetylene-heating-oxygen mixture and has a diameter of about 3.6 mm in view of a suitable supply of heating gases to the cutting oxygen jet.

The nozzle torch may also be operated with other fuel gases, preferably with propane, natural gas, illuminating gas, methane, but also with other known fuel gases and indeed without changing the cutting nozzle and with constant dimensions of the mixing system. For this purpose, instead of the acetylene heating cover, it is suitable in view of the preheating capacity of the torch to use a heating cover with a larger outlet opening (e.g. about 5 mm). The outlet bore 13 is preferably constructed cylindrically. The length 38 of the bore 13, with respect to slowly combustible gases — e.g. propane, is larger than with respect to gases with great combustion speed, such as acetylene. The cutting nozzle 11 is advantageous for all torches and remains unchanged.

Using the novel torch, greater cutting speeds may be reached with the cutting surface quality remaining the same. The torch may be used for a large material thickness area, preferably for material thicknesses of 3 to 100 mm.

The invention has been described above with respect to the use of a fuel gas - heating oxygen mixture supplied to the processing oxygen jet. The invention equally encompasses, however, the separate supply of the mixture components of fuel gas and heating oxygen to the processing oxygen jet, the separate supply being effected through annular channels or openings. Thus the term "mixture component channel means" refers to either at least one channel for conveying a mixture of the components or individual channels for the individual components.

What is claimed is:

1. In a torch for the thermochemical processing of work pieces comprising a nozzle having at least one channel for the processing gas, said channel being formed in a direction from upstream to downstream by a cylindrical section joined to a conical section joined to a depression joined to a cylindrical recess and terminating in a cylindrical outlet bore, said depression being at an angle between 90° and 150°, said outlet bore having a larger diameter than said recess, and said nozzle having further mixture component channel means leading into said bore.

2. In the torch of claim 1 wherein the depression is at an angle of 120°.

3. In the torch of claim 1 wherein said conical section widens outwardly at a cone angle of about 6°.

4. In the torch of claim 2 wherein said the length of said cylindrical outlet bore is about 0.1 to 1 mm.

5. In the torch of claim 4 wherein the length of said cylindrical bore is 0.3 mm.

6. In the torch of claim 4 wherein said mixture component channel means communicates with said outlet bore through an annular channel.

7. In the torch of claim 6 wherein said nozzle includes a nozzle body and a nozzle cap slipped thereover, the discharge end of said nozzle body being reset in and spaced from the discharge end of said cap to create said annular channel therebetween.

8. In the torch of claim 7 wherein said mixture component channel means communicates with said annular channel by means of slots formed in the outer wall of said nozzle body, and said slots being covered by the nozzle cap.

9. In the torch of claim 8 wherein said slots have a depth of about 1.3 mm and a width of 0.2 to 0.4 mm.

10. In the torch of claim 9 wherein the slot width is 0.3 mm.

11. In the torch of claim 9 wherein said cutting body and the surrounding conical bore of said nozzle cap are conically constructed, and the cone angle being about 25° to 30°.

12. In the torch of claim 11 wherein said nozzle cap, viewed in the direction of flow, is formed to taper conically behind the conical bore with its cone angle being about 120°.

* * * * *